March 27, 1951     E. A. ROCKWELL     2,546,678
PRESSURE RESPONSIVE VALVE DEVICE
Original Filed April 11, 1941
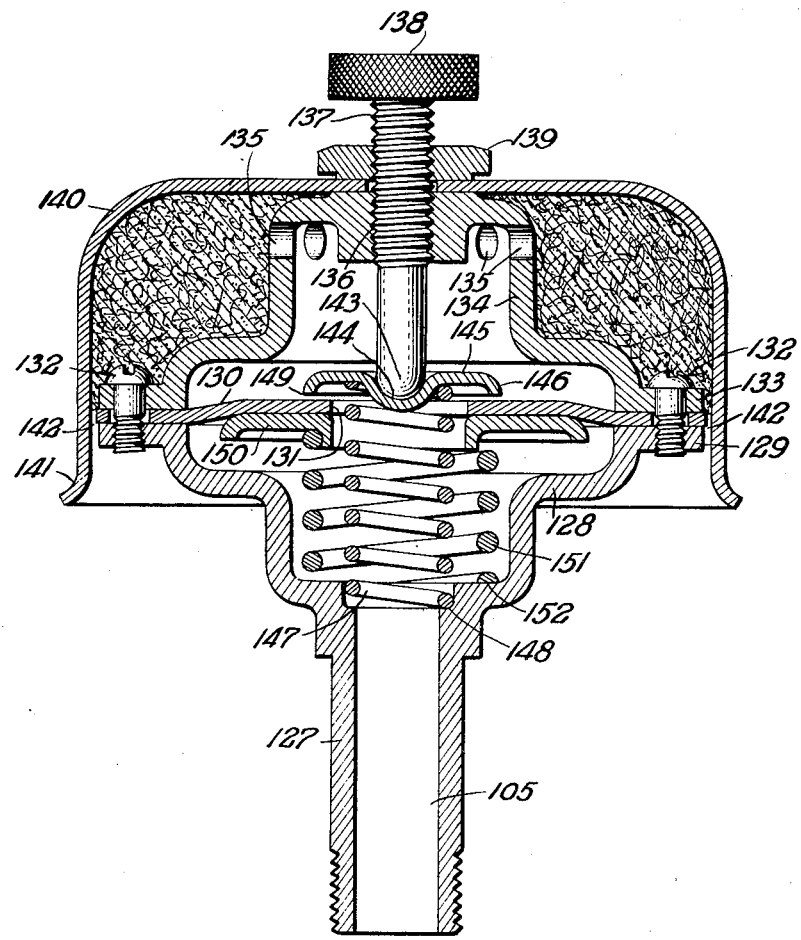
Inventor:
Edward A. Rockwell,
by Arthur Wright
Attorney Patented Mar. 27, 1951

2,546,678

UNITED STATES PATENT OFFICE 2,546,678

PRESSURE RESPONSIVE VALVE DEVICE

Edward A. Rockwell, Cleveland, Ohio

Application February 17, 1943, Serial No. 476,245, which is a division of application Serial No. 388,003, April 11, 1941. Divided and this application October 28, 1944, Serial No. 560,866

1 Claim. (Cl. 251—119)

My invention relates particularly to a pressure responsive valve device which is adapted to control the amount of the gaseous medium admitted and which, for example, is especially adapted for the operation of power units in connection with automobiles, airplanes, etc.

The present application is a division of my application upon Valve Apparatus, Ser. No. 476,245, filed February 17, 1943, Patent No. 2,388,220, granted October 30, 1945, which in turn is a division of my application upon Power Intensifier Valve, Ser. No. 388,003, filed April 11, 1941, Patent No. 2,398,252, granted April 9, 1946.

The object of my invention is to provide a device of this character for controlling the amount of air, for example, admitted to power units of the above character and so as, preferably, to control the hydraulic output pressures of the apparatus. A further object is to provide an adjustable means for this purpose which may be adjusted according to the altitude at which the engine is being operated or according to the maximum hydraulic output pressure desired to be attained. Further objects of my invention will appear from the detailed description of the same hereinafter.

While my invention is capable of embodiment in many different forms, for the purpose of illustration I have shown only one form thereof in the accompanying drawings in which the figure is a vertical section of the air inlet device.

Referring to the drawing, I have shown an air inlet device having a pipe 105, for venting a vacuum operated hydraulic power device (not shown), in which there is provided means for adjusting the amount of air admitted at different altitudes at which the automobile is operated and so as to control the outlet pressure of the apparatus. In the figure I have shown connected to the air vent port 105 a screw-threaded tube 127 having a flared portion 128 provided with a flange 129 against which there is clamped a rubber diaphragm 130, having a central aperture 131, by means of screws 132 passing through the diaphragm into said flange 129 and passing through a flange 133 on an air valve housing 134 provided with air ports 135. The upper portion of the housing 134 has a screw-threaded opening 136 through which there is arranged to pass an adjusting screw 137 provided with a knurled head 138. On the screw 137 there is a lock-nut 139 so as to hold in place above the housing 134, an air filter shell 140 filled with horse hair and which has a depending rim 141 so arranged as to leave an annular air inlet 142 between the same and the flanges 129 and 133. The adjusting screw 137 has a rounded lower end 143 which is received in a recess 144 in an air valve plate 145 having a downwardly directed rim 146, the air valve plate 145 being pressed upwardly by a compressed spring 147 which is supported at its lower end on a shoulder 148 within the tube 127. The rim 146 is arranged to be adjusted into or out of contact with the diaphragm 130 so as to provide an air passageway 149 between the valve plate 145 and said diaphragm 130. The diaphragm 130 is supported in its uppermost position by a supporting ring 150 which is dished upwardly so as to receive a coil spring 151 seated at its lower end on a shoulder 152 in the inside of the flared portion 128 of the tube 127. When operating the automobile at high altitudes the spring 151 will be in its position of full extension with the plate 145 adjusted out of contact with the diaphragm 130, whereas at lower altitudes or where the output pressure applied to the brakes is to be lessened, the plate 145 will be adjusted into contact with the diaphragm 130 so as to compress the spring 151 more or less, as desired, according to the position of the screw 137.

In the operation of the apparatus, the adjusting screw 137 is arranged to adjust the air inlet plate 145 to any desired position according to the altitude at which the automobile is operating or according to the amount of the maximum output pressure desired to be applied to the brakes. In other words, when the automobile is operating at a high altitude, with consequent lessened atmospheric pressure, the plate 145 will be adjusted upwardly to a position away from contact with the diaphragm 130. When, however, the automobile is operating at a lower altitude, or when it is desired to decrease the maximum available pressure output supplied to the brakes, the plate 145 will be adjusted downwardly by the screw 137 until it contacts with the diaphragm 130 or until, by further adjustment, it compresses the spring 151 to the point desired. Whereupon the diaphragm 130 acts as a check valve to prevent more than the adjusted maximum desired pressure being obtained. Of course, when the apparatus is being operated to apply pressure to the brakes, the incoming air will in any case pass through the air inlet 142, ports 135, passage 149 and thence into the tube 127, thus applying to the diaphragm 130 a degree of the vacuum existing in the said hydraulic power unit. When the valve plate 145 has been adjusted into contact with the diaphragm 130, the incoming air pressure will move the diaphragm 130 downwardly by compressing the spring 151.

It will be understood that instead of the port 105 being a vent this may be connected to a source of superatmospheric air pressure.

While I have described my invention above in detail I wish it to be understood that many changes may be made therein without departing from the spirit of the same.

I claim:

An air inlet device comprising a valve housing having an inlet chamber and an outlet chamber, an apertured flexible diaphragm separating said chambers, a spring urging said diaphragm in one direction, a manually adjustable screw mounted in said housing, a valve member engaging said screw normally in contact with said diaphragm and arranged to cooperate with the aperture in said diaphragm to control the passage of air through said aperture, and a spring for holding said valve member in engagement with said screw.

EDWARD A. ROCKWELL.

REFERENCES CITED

The following references are of record in the file of this patent:

UNITED STATES PATENTS

| Number | Name | Date |
|---|---|---|
| 28,722 | Whitaker | June 12, 1860 |
| 1,380,787 | Ellmauer | June 7, 1921 |
| 1,608,618 | Richards | Nov. 30, 1926 |
| 1,887,515 | Pulkinghorn | Nov. 15, 1932 |
| 2,009,696 | King | July 30, 1935 |
| 2,290,151 | McCollim | July 21, 1942 |
| 2,390,527 | Flint | Dec. 11, 1945 |

FOREIGN PATENTS

| Number | Country | Date |
|---|---|---|
| 40,557 | Sweden | Apr. 26, 1916 |